Patented May 31, 1927.

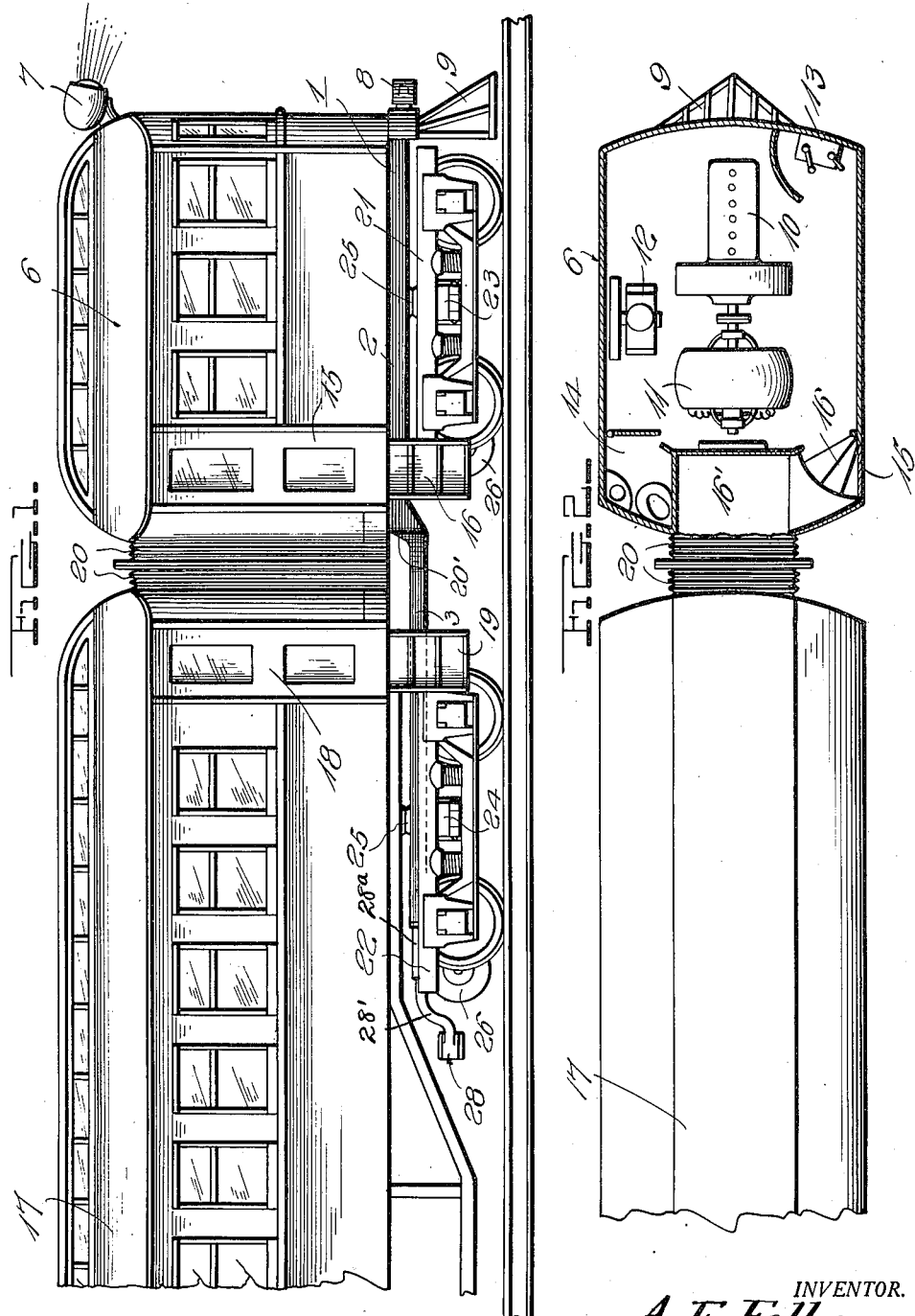

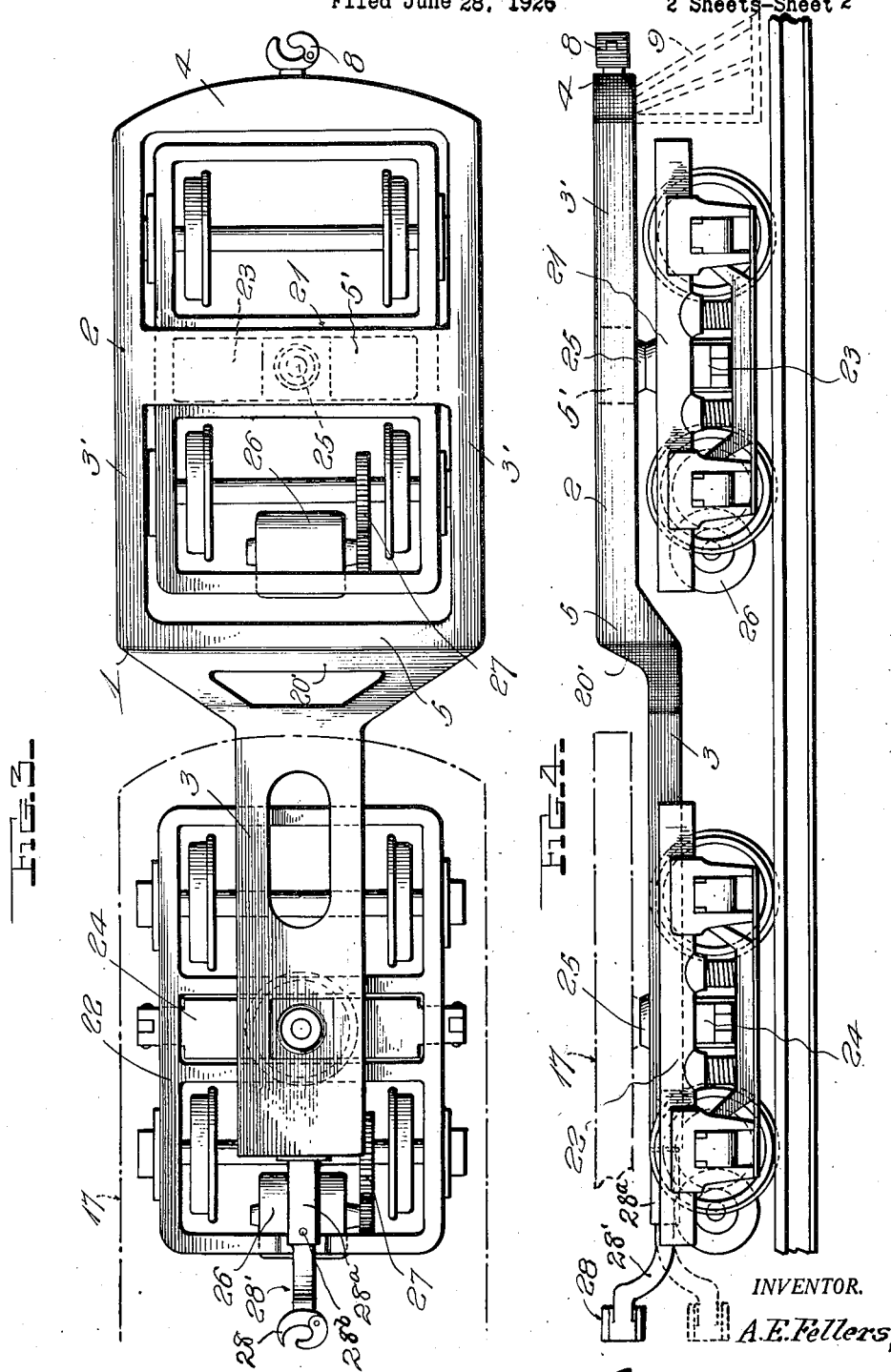

1,630,930

UNITED STATES PATENT OFFICE.

ALBERT E. FELLERS, OF DETROIT, MICHIGAN.

TRACTOR LOCOMOTIVE.

Application filed June 28, 1926. Serial No. 119,000.

This invention relates to tractor locomotives, and particularly to a tractor locomotive designed for comparatively light-draft and short-haul purposes, such as for drawing interurban trains or cars, switching railway rolling stock, or forming a unit combination of a locomotive and a car in which a rear extension of the locomotive structure forms a wheeled truck support for the forward end of a car coupled thereto.

One object of my invention is to provide a locomotive which may be coupled to a car or train in the usual manner through the medium of the usual couplers, or which may be combined with a car to form a unit combination of the character set forth.

A further object of the invention is to provide a locomotive which may be used in conjunction with passenger cars of the usual standard construction, and without the necessity of employing a special type of car for the purpose of forming a combined locomotive and car unit.

A still further object of the invention is to provide a locomotive comprising a main frame having a forward cab and power plant supporting portion and a rear coupling or car end supporting portion, said portions each being mounted upon separate wheeled trucks, and so combined as to be effectively counterbalanced for smooth running purposes and to prevent jolts, jars and vibrations which would otherwise be produced and transmitted to the car or train.

A still further object of the invention is to provide a locomotive in which driving power may be applied separately or conjointly to its front and rear trucks, allowing greater or less driving power to be employed as required, as well as enabling better traction to be obtained, in the association of a locomotive and car as a unit combination, without the transmission of power vibrations to the car.

A still further object of the invention is to provide a locomotive of the character described in which both trucks are swiveled upon the main frame of the locomotive so as to allow sharp curves to be rounded with ease and facility.

A still further object of the invention is to provide a locomotive of the character described the rear portion of which is adapted to form a truck support for the end of a standard type of vestibule car coupled thereto in such manner as to permit proper clearance between the locomotive frame and side steps of the car during the lateral swinging motions of the locomotive main frame and truck frames.

A still further object of the invention is to provide a locomotive of the character described which is simple of construction, light in weight, capable of being economically operated at all speeds and of running at comparatively high speed, which will furnish maximum power in proportion to its weight, and which may be driven by the power of one or more prime movers which may be oil, gas, steam, etc., or by combined hydrocarbon oil and electrical driving means.

With these and other objects in view, the invention consists of the features of construction, combination and arrangement of parts, hereinafter fully described and claimed, reference being had to the accompanying drawings, in which:—

Figure 1 is a side elevation of a tractor locomotive embodying my invention, and one end of a car coupled thereto in a manner to provide a unit combination.

Figure 2 is a top plan view thereof, the locomotive cab appearing in horizontal section.

Figure 3 is a top plan view of the locomotive main frame and trucks.

Figure 4 is a side elevation of the same.

In carrying my invention into practice, I provide a tractor locomotive comprising a main frame 1 having a front portion 2 and a rear portion 3. The front frame portion 2 is in the form of an oblong rectangular loop, comprising side beams 3' connected by front, rear and central cross-beams 4, 5 and 5'. The frame portion 2 thus provides an open table-like bed frame to support the locomotive cab 6 which rests thereon and which is bolted or otherwise properly secured thereto. The cab 6 may be equipped with a headlight 7, and to the cab structure or to the frame portion 2 may be applied a coupler 8 and fender or cow-catcher 9 of the usual or any preferred type. The cab forms an enclosure for the power mechanism which may be of any suitable type, that shown in the present instance consisting of an engine 10 such, for example, as a Diesel engine or other engine using a hydrocarbon fuel, from which is driven a dynamo or generator 11 for furnishing current to the driving motors. Within the cab is also arranged an air compressor 12, for supplying compressed air to the engine (in the use of a Diesel engine) and to the air brake system, and which may be driven directly from the engine or by a motor supplied with current from the generator. The cab further encloses a controller 13 including suitable control devices for governing the supply of current to the motor or motors and the flow of air in the air brake system, etc., and such other controlling devices as may be required for service use. At the rear the cab may be provided at one side with a lavatory or storage compartment 14, at its opposite side with a doorway and suitable door 15, also with suitable steps 16 leading to the doorway, and between the compartment 14 and doorway the cab may be provided with a vestibule 16' leading at the doorway side into the cab body and opening at its rear through the rear end of the cab. In the locomotive and car combination unit illustrated, I have shown the locomotive cooperatively combined with a passenger or other car 17 of standard type, provided at one or both ends with side doors 18, steps 19 and a vestibule (not shown), with which the doorways communicate, the vestibule portions of the locomotive and car being provided with flexible vestibule diaphragms and face plates 20 which may be of usual type.

The rear portion 3 of the main frame 1 is rigid with the front frame portion 2 and extends rearwardly therefrom in the form of a draft bar or tongue. This tongue 3 is united to the rear cross-beam 5 of the frame part 2 by a depressed portion or offset 20', so that said tongue 3 lies in a horizontal plane below the plane of the part 2. The tongue 3 thus is arranged at such a level that it may be extended under the end of a car, as shown in Figure 1, so that such end of the car may be directly mounted thereon. The tongue 3 is also of less width than the width of the frame portion 2 and of such restricted width that it may lie between adjacent wheels of a truck mounted thereon and also between the adjacent steps at the sides of the car 17 in such manner as to allow the tongue, car truck and car body to have relative lateral swinging movements without interference between the tongue, truck wheels or side steps of the car. The frame portion 2 is provided with a wheeled truck 21 on which it is mounted and the tongue 3 is provided with a wheeled truck 22 on which it is mounted. These trucks may be either of two, four or six wheeled type and the wheels thereof may be mounted on axles journaled in spring supported bearing boxes in the usual way. The trucks are provided with spring supported bolsters 23 and 24, which may be of usual or suitable type, and which are connected by swivel bearings 25 to the frame portions 2 and 3 and to the cab structure 6 and car body structure 17, if desired. In practice, the upper and lower bearing members of the bearing 25 of the front truck 21 may be mounted respectively on the cross bar 5' and on the bolster 23, while the swivel bearing 25 of the rear truck 22 is preferably swiveled to the tongue 3 which is in turn swiveled to the adjoining end of the car body 17; in other words, a double bearing being provided at this point to permit the truck 22 to swing independently of the tongue 3 and the latter to swing independently of both the truck and the car, allowing great freedom of motion of these parts in the travel of the train around sharp curves. As both trucks 21 and 22 are swiveled, it will be apparent that an articulating connection is produced which allows easy and free running of the locomotive and car around the sharpest possible curves without causing undue strains upon the running gear or transmitting undue shocks, jars or vibrations to the locomotive cab or car body. Supported by each truck 21 and 22 is a driving motor 26 each in driving connection through suitable gearing 27 with an axle of the truck on which it is mounted, so that, by the use of suitable controllers, current may be supplied for driving one of the motors independently or both motors simultaneously, so that the driving power may be varied as may be required under different service conditions. Thus when the load is light and the train traveling along a level stretch of track, the driving power of a single motor may be sufficient, while when the load is heavy or the train is traveling up a heavy grade the power of both motors may be applied to give the increased power required. This allows the engine and generator to be driven at reduced speed when supplying current to a single motor, so that economy of operation will be obtained. A coupler 28, of standard type or of other suitable type, is mounted upon the frame extension or tongue 3. This coupler is carried by a shank 28' mounted in a support or draw-bar 28ᵃ carried by the part 3. The draw-bar is so mounted upon the tongue 3, or the shank 28' so mounted upon the draw-bar, that the coupler 28 may be shifted through an arc of 180° between operative and inoperative positions, as indicated respectively in full and dotted lines in Figure 4. In so adjusting the coupler it is rotated on the shank or the draw-bar as an axis for disposing it in either of the two positions noted. In the present disclosure, the shank 28' is rotatably mounted in the draw-bar 28ᵃ, and a pin or like fastening device 28ᵇ is provided for engagement with openings in the shank and draw-bar to hold the coupler and shank in either of its two positions of adjustment. The shank 28' is curved or provided with a goose-neck portion, so disposing the coupler 28 that it will project above the plane of the frame portion 3 when in coupling position for engagement with a coupler on a car, while when swung to an inoperative position the coupler will lie below the plane of the tongue 3 and the upper surface of the rear truck 22, allowing the truck and tongue to be inserted under or withdrawn from under the end of a car without interference from the coupler. In the provision of a unit combination of a locomotive and car, in the manner shown, however, the truck at the end of the car which is coupled to the locomotive is removed and such end of the locomotive mounted upon the tongue 3 and truck 22, as will be readily understood. In this assemblage of the parts, the coupler will occupy its inoperative position as shown in dotted lines in Figure 4.

By means of the locomotive construction described, a unit combination may be formed in the simple manner set forth between the locomotive and any passenger, baggage or combination car of conventional type and without the necessity of providing a car having special doors or otherwise specially constructed for the purpose. This unit combination has the advantage that when a car is so coupled to and mounted upon the locomotive a balanced organization is produced in which the driving power may be applied to the trucks of the locomotive, to enable maximum traction to be obtained without power vibrations or strains being transmitted to the car body; while at the same time a balanced type of locomotive per se is provided which may be coupled to a car or train in the ordinary manner for general hauling or switching purposes. It will, of course, be understood that any suitable means may be employed for supporting the end of a car during the removal of its trucks and the placing of the rear truck portion of the locomotive in position in the operation of making up the unit combination.

Having thus fully described my invention, I claim:

1. A tractor locomotive comprising a frame having a rearward extension, a cab supported on said frame in advance of said rearward extension, a wheeled truck independent of the frame and supporting said frame beneath the cab, and a wheeled truck independent of said rearward extension and supporting said rearward extension wholly in rear of the rear end of the cab.

2. A tractor locomotive comprising a frame having a rearward extension, a cab supported on said frame in advance of said rearward extension, a wheeled truck swiveled to the frame beneath the cab, and a wheeled truck swiveled to the rearward extension of the frame wholly in rear of the rear end of the cab.

3. A tractor locomotive comprising a frame having a main frame portion and a rearward extension therefrom, a cab supported by the main frame portion, a wheeled truck beneath the main frame portion and swiveled thereto, and a wheeled truck swiveled to said rearward extension of the main frame portion.

4. A tractor locomotive comprising a main frame having a front frame portion and a rear frame portion, the rear frame portion being rigidly connected with and lying in a horizontal plane below the horizontal plane of the front frame portion, a cab supported upon the front frame portion, a truck connected with the front frame portion, and a truck connected with the rear frame portion.

5. A tractor locomotive comprising a frame having a front frame portion and a rear frame portion, a cab supported by the front frame portion, a truck connected with said front frame portion, a truck connected with the rear frame portion, and a coupler carried by the rear frame portion.

6. A tractor locomotive comprising a frame having a front frame portion and a rear frame portion, the latter adapted to be extended under the forward end of a car so as to form a support therefor, an independent set of wheeled running gear swiveled to each frame portion, a cab supported by the front frame portion, a coupler on the rear frame portion for coupling action with a coupler on a car, means upon the rear frame portion for swiveling it to the end of a car supported thereon, and power mechanism carried by the locomotive for transmitting driving motion to at least one of said sets of running gear.

7. A tractor locomotive comprising a frame having a front frame portion and a rear frame portion, a cab supported by the front frame portion, a wheeled truck swiveled to the front frame portion, the said rear frame portion being adapted to extend beneath the end of a car, and a wheeled truck swiveled to said rear frame portion and to the car.

8. A tractor locomotive comprising a front frame portion and a rear frame portion, said rear frame portion lying at a lower level than the front frame portion and being of reduced width with respect thereto, a cab supported upon the front frame portion, and trucks connected with the front and rear frame portions respectively.

9. A tractor locomotive comprising a frame having a front frame portion and a rear frame portion, said rear frame portion being arranged in a horizontal plane below the horizontal plane of the front frame portion and being of reduced width with respect thereto, a cab supported by the front frame portion, trucks carried by the front and rear frame portions respectively, and power mechanism including a source of power mounted within the cab for transmitting driving motion to the wheels of at least one of said trucks.

10. A tractor locomotive comprising a frame having a front frame portion and a rear frame portion, the rear frame portion being disposed at a lower horizontal level than the front frame portion and being of reduced width with respect thereto, a cab mounted upon the front frame portion, trucks swiveled to said front and rear frame portions respectively, and power mechanism including a source of power mounted in the cab for transmitting driving motion to the wheels of at least one of the trucks.

11. A tractor locomotive comprising a frame having a front frame portion, a wheeled truck swiveled thereto, a rear frame portion in the form of a tongue projecting rearwardly from the front frame portion, said rear frame portion being arranged at a horizontal level below the level of the front frame portion and being of reduced width with respect thereto, and a wheeled truck swiveled to said tongue.

12. In a motor driven vehicle, a car, a frame having a front frame portion arranged in advance of the car and a rear frame portion extending beneath the adjacent end of the car, a cab mounted upon the front frame portion, a wheeled truck swiveled to said front frame portion, and a wheeled truck swiveled to the rear frame portion and to the car.

13. The combination of a locomotive having a frame provided with a front cab supporting portion and a rear car supporting portion, each having a wheeled truck, a cab carried by said cab supporting portion of the locomotive frame, and a standard coach mounted at one end upon the rear car supporting portion of the locomotive frame.

14. In a locomotive-car unit, a coach, a locomotive having a frame the rear end of which projects beneath one end of the coach and the forward end of which extends in advance of such end of the coach, a cab and power mechanism mounted upon the forward end of the locomotive frame, a front truck swiveled to the forward end of the locomotive frame beneath the cab, and a rear truck swiveled to the rear end of the locomotive frame and to the end of the coach beneath which it extends.

15. A tractor locomotive comprising a frame having a front frame portion and a rear frame portion, said rear frame portion lying in a plane below the plane of the front frame portion, a cab mounted upon the front frame portion, a truck mounted upon the front frame portion, a truck mounted upon the rear frame portion, and a coupler upon the rear frame portion movable downwardly to an operative position to permit said rear frame portion and its truck to be inserted beneath the end of a car and said coupler being movable upwardly to a working position in which it will be disposed at a higher level for a standard coupling action.

16. A tractor locomotive comprising a frame having a front frame portion and a rear frame portion, said rear frame portion lying in a plane below the plane of the front frame portion, a cab mounted upon the front frame portion, a truck mounted upon the front frame portion, a truck mounted upon the rear frame portion, a coupler upon the rear frame portion for coupling coaction with a coupler on a car, said coupler being movable to an inactive or out of use position to permit said rear frame portion to be disposed beneath the end of a car so as to form a wheeled support therefor, and means for swiveling said rear frame portion to the end of a car beneath which it is disposed.

In testimony whereof I affix my signature.

ALBERT E. FELLERS.